J. SMITH.
WAVE MOTOR.
APPLICATION FILED JULY 24, 1911.
1,009,592.
Patented Nov. 21, 1911.
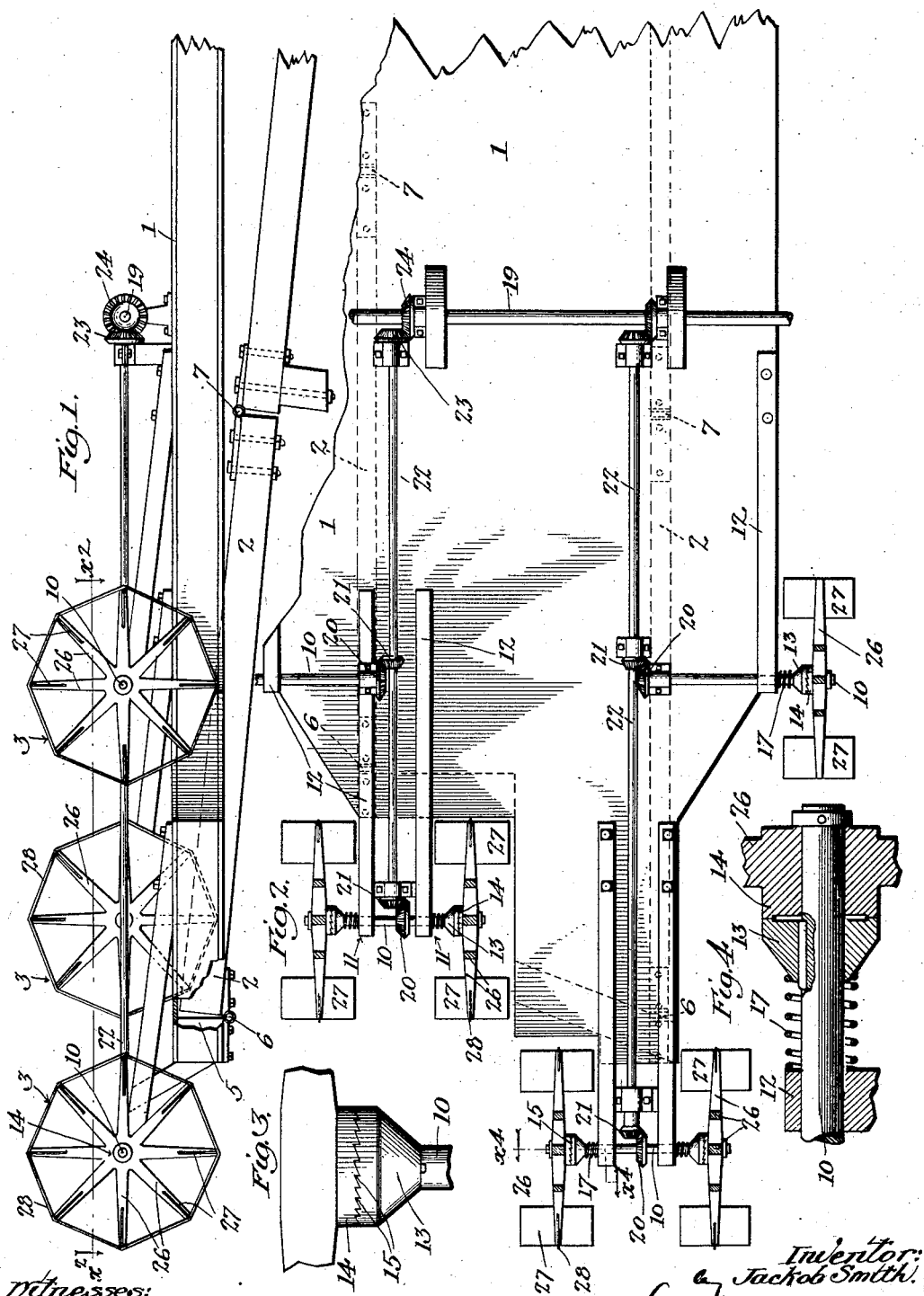

UNITED STATES PATENT OFFICE.

JACKOB SMITH, OF LOS ANGELES, CALIFORNIA.

WAVE-MOTOR.

1,009,592.  Specification of Letters Patent.  Patented Nov. 21, 1911.

Application filed July 24, 1911. Serial No. 640,340.

*To all whom it may concern:*

Be it known that I, JACKOB SMITH, a citizen of the United States, residing at Los Angeles, in the county of Los Angeles and State of California, have invented a new and useful Wave-Motor, of which the following is a specification.

This invention relates to a motor for producing motive power by the action of the waves of the ocean, or other body of water, and the main object of the invention is to provide an apparatus for this purpose which is applicable for operation on a large scale, the construction of the apparatus being such that it can be extended indefinitely in any direction, to utilize the waves along the shore line for any required distance.

Another object of the invention is to provide an apparatus in which the motive elements will automatically adapt themselves to the variations in the general level of the water so as to rise and fall with the tide.

A further object of the invention is to provide rotary means for receiving the impact of the waves, and producing continuous rotary motion therefrom, in one direction.

Other objects of the invention will appear hereinafter.

The accompanying drawings illustrate the invention, and referring thereto: Figure 1 is a side elevation of the apparatus, partly broken away. Fig. 2 is a plan of the apparatus, partly broken away. Fig. 3 is a plan of one of the slip clutch devices. Fig. 4 is a section on line $x^4$—$x^4$ in Fig. 2.

The apparatus comprises a raft or float 1, means 2, for anchoring said float in fixed position, while allowing it to rise and fall with the variations of the water level, rotary motive devices or wheels 3, mounted on said raft or float, and power transmitting devices connected to be operated by said wheels.

The raft or float 1 may be of any suitable construction being, for example, composed of pontoons or hollow vessels of wood or other suitable material, to cross bars 5. Any desired number of anchoring means 2 may be provided, each hinged at its outer end to raft or float 1, by hinge 6 and connected by hinge 7 at its inner end to a suitable fixed support or deadman embedded, or fixed in position in the bed of the body of the water.

The rotary members or wheels 3 are preferably arranged in pairs, one at each end of a shaft 10, said shaft being journaled in bearings 11 on a frame 12, and said wheels being loosely mounted on said shaft to rotate freely thereon in one direction, but connected to turn the shaft when rotating in the other direction. For this purpose, a collar 13 is splined on the shaft to move to and from a hub 14 on each wheel, said collar and hub having ratchet teeth 15 engaging in one direction of rotation to clutch the wheel to the shaft but allowing the wheel to slip freely in the other direction of rotation. A spring 17 presses said collar 13 into engagement with said hub, and allows the collar to yield in a reverse rotation of the wheel, so that the ratchet teeth slip past one another. Several sets or pairs of rotary members or wheels 3, may be provided on each float or raft, said pairs being arranged in different positions longitudinally and transversely of the raft, in staggered arrangement so as to receive different positions of the wave, and be acted thereon at different times, and all of said wheels are connected together and to a power receiving shaft 19 so as to drive said shaft continuously by the operation of the several wheels. For this purpose, the several shafts 10 may be provided with bevel gears 20, engaging with bevel gears 21 on longitudinal shafts 22 which are connected by bevel gears 23 and 24 with driven shaft 19. Three of these sets of wheels or wave receiving members 3, are shown, but the system may be indefinitely extended, as indicated by the break at the upper part of Fig. 2, to as great a length as may be desired, and in general, there would be a series of floats arranged side by side, and connected to a driven shaft, to apply the power from the rotary elements to the said shaft. The size and number of the wheels 3, will depend upon the amount of power required to be supplied. Each wheel 3 preferably consists of arms 26 extending radially from the hub 14, and blades or paddles 27, secured to the respective arms 26 and extending transversely to the plane of the rotation of the wheels. If required, the said arms may be braced by a tie rod or cable 28, extending around the series of arms 26.

The operation is as follows: The waves in their movement toward the shore strike the paddles 27 of the wheels 3, at the lower part of the wheels, and turn said wheels, and this rotation is communicated to the shafts 10 by the ratchet clutch means 13 and 14, said shafts 10, operating through the gearing above described to drive the shaft 19. As the water recedes, there will be a tendency for the wheels to rotate in the opposite direction, and in this movement the clutch means aforesaid allow such backward rotation, without interfering with the rotation of the shaft 10, and as one or more of the wheels will always be in the path of the advancing wave, there will be a continuous rotative driving effect on the shafts 19. As the water rises or falls with the tide or swells, the raft or float 1 rises or falls therewith, so as to maintain the wheels in proper position to receive the impact of the waves, the hinged beams 2 allowing of this up and down movement of the raft or float while holding the same from longitudinal displacement.

What I claim is:

1. A wave motor comprising a float, a plurality of shafts journaled on said float, wheels rotatably mounted on the respective shafts, collars splined on said shafts, said collars and wheels having corresponding ratchet teeth and spring means, for forcing the ratchet teeth on said collars against the ratchet teeth on said wheels, to cause driving engagement between the wheels and shafts in rotation of the wheels in one direction, and to allow the wheel to turn freely in the other direction.

2. A wave motor comprising a float, a plurality of wheels rotatably mounted thereon, said wheels being mounted in staggered arrangement on said float, a driven shaft, and driving connections from said wheel to said driven shaft, said driving connections including ratchet devices allowing each wheel to move freely backward, but to clutch it into driving connection in its forward movement.

In testimony whereof, I have hereunto set my hand at Los Angeles, this 17th day of July 1911.

JACKOB SMITH.

In presence of—
ARTHUR P. KNIGHT,
GLADYS RUSSELL.

Copies of this patent may be obtained for five cents each, by addressing the "Commissioner of Patents, Washington, D. C."